(12) United States Patent
Ghadiyali et al.

(10) Patent No.: US 10,924,532 B2
(45) Date of Patent: Feb. 16, 2021

(54) PRESENTING SUGGESTION CONTENT IN REACTION TO CONTENT GENERATION

(71) Applicant: Facebook, Inc., Menlo Park, CA (US)

(72) Inventors: Zainab G. Ghadiyali, Mountain View, CA (US); Henry Andy Soong, Oakland, CA (US); Oleksandr Sokolov, Fremont, CA (US); Connor C. Hayes, San Francisco, CA (US); Hoyd Manuel Breton, Brooklyn, NY (US)

(73) Assignee: Facebook, Inc., Menlo Park, CA (US)

( * ) Notice: Subject to any disclaimer, the term of this patent is extended or adjusted under 35 U.S.C. 154(b) by 846 days.

(21) Appl. No.: 15/007,121

(22) Filed: Jan. 26, 2016

(65) Prior Publication Data

US 2017/0212664 A1 Jul. 27, 2017

(51) Int. Cl.
| | | |
|---|---|---|
| *G06F 3/048* | (2013.01) |
| *H04L 29/08* | (2006.01) |
| *G06Q 30/02* | (2012.01) |
| *G06Q 50/00* | (2012.01) |

(52) U.S. Cl.
CPC .......... *H04L 67/10* (2013.01); *G06Q 30/0242* (2013.01); *G06Q 30/0257* (2013.01); *G06Q 30/0271* (2013.01); *G06Q 30/0277* (2013.01); *G06Q 50/01* (2013.01); *H04L 67/125* (2013.01); *H04L 67/20* (2013.01); *H04L 67/306* (2013.01)

(58) Field of Classification Search
CPC ........... G06Q 30/0242; G06Q 30/0271; G06Q 30/0277; G06Q 10/10; G06Q 50/01; G06Q 30/0257; G06F 3/048; H04L 67/10; H04L 67/125; H04L 67/20; H04L 67/306

See application file for complete search history.

(56) References Cited

U.S. PATENT DOCUMENTS

| | | | |
|---|---|---|---|
| 6,606,644 B1 * | 8/2003 | Ford | G06F 17/30864 |
| | | | 707/999.003 |
| 9,070,141 B2 | 6/2015 | Hua et al. | |
| 9,317,812 B2 | 4/2016 | Kabiljo et al. | |
| 10,395,321 B2 | 8/2019 | Shalita et al. | |
| 2009/0089417 A1 * | 4/2009 | Giffin | G06F 17/30867 |
| | | | 709/224 |
| 2010/0257112 A1 * | 10/2010 | Barrett | G06Q 10/10 |
| | | | 705/319 |
| 2011/0047117 A1 * | 2/2011 | Sinha | G06F 9/543 |
| | | | 706/47 |

(Continued)

*Primary Examiner* — Mahelet Shiberou
(74) *Attorney, Agent, or Firm* — Baker & Hostetler LLP (57) ABSTRACT

Content is presented to a user in reaction to the user generating content on an online system, such as a social networking system. A user with a role associated with a page provides content to the system to deliver to users of the system. The social networking system generates a content item based on the provided content, and can associate that content with the page or entity associated with the page. After generating the content item, the system presents reaction content items to the user. Reaction content items contain content that is useful and relevant to the user regarding the content that the user has created or regarding future content. The system determines a measure of relevance of the eligible reaction content items and displays reaction content items to the user based on the measure of relevance determined for each reaction content item.

20 Claims, 6 Drawing Sheets

(56) References Cited

U.S. PATENT DOCUMENTS

| | | | |
|---|---|---|---|
| 2011/0125826 A1* | 5/2011 | Erhart | G06Q 10/10 709/202 |
| 2011/0191246 A1* | 8/2011 | Brandstetter | G06Q 30/02 705/59 |
| 2011/0252011 A1* | 10/2011 | Morris | H04L 12/185 707/706 |
| 2011/0296351 A1* | 12/2011 | Ewing, Jr. | G06F 3/0346 715/841 |
| 2012/0016948 A1* | 1/2012 | Sinha | G06Q 10/10 709/207 |
| 2012/0054278 A1* | 3/2012 | Taleb | G06Q 50/01 709/204 |
| 2012/0166532 A1* | 6/2012 | Juan | G06Q 30/0224 709/204 |
| 2012/0233191 A1* | 9/2012 | Ramanujam | G06F 16/9535 707/758 |
| 2013/0226708 A1* | 8/2013 | Good | G06Q 10/00 705/14.66 |
| 2013/0227384 A1* | 8/2013 | Good | H04L 67/10 715/205 |
| 2014/0040030 A1* | 2/2014 | Winters | G06Q 30/0261 705/14.58 |
| 2014/0041055 A1* | 2/2014 | Shaffer | G06Q 10/10 726/28 |
| 2014/0067523 A1* | 3/2014 | Barnett | G06Q 30/0277 705/14.45 |
| 2014/0089816 A1* | 3/2014 | DiPersia | G06F 3/0484 715/753 |
| 2014/0122622 A1* | 5/2014 | Castera | H04L 51/04 709/206 |
| 2014/0136521 A1* | 5/2014 | Pappas | G06Q 50/01 707/722 |
| 2014/0156360 A1 | 6/2014 | Shalita et al. | |
| 2014/0156566 A1* | 6/2014 | Kabiljo | G06N 99/005 706/12 |
| 2014/0156744 A1* | 6/2014 | Hua | G06Q 30/0251 709/204 |
| 2014/0157145 A1* | 6/2014 | Bush | G06Q 50/01 715/745 |
| 2014/0278356 A1* | 9/2014 | Anglin | G06F 17/2785 704/9 |
| 2014/0289006 A1* | 9/2014 | Palmer | G06Q 30/0204 705/7.31 |
| 2015/0067048 A1* | 3/2015 | Kannan | H04L 65/40 709/204 |
| 2015/0113399 A1* | 4/2015 | Bilinski | G06F 3/0482 715/716 |
| 2015/0254708 A1* | 9/2015 | Rabii | G06Q 30/0242 705/14.41 |
| 2015/0269155 A1* | 9/2015 | Bastide | G06Q 10/101 707/723 |
| 2016/0036973 A1* | 2/2016 | Harasimiuk | H04L 51/32 379/265.13 |
| 2016/0148265 A1* | 5/2016 | Lim | G06Q 30/0257 705/14.55 |
| 2016/0259464 A1* | 9/2016 | Chan | G06F 1/163 |
| 2016/0335679 A1* | 11/2016 | Kshirsagar | G06Q 30/0269 |
| 2017/0063777 A1* | 3/2017 | Ekberg | H04L 51/36 |
| 2017/0317965 A1* | 11/2017 | Harasimiuk | H04M 3/5191 |

* cited by examiner

PRESENTING SUGGESTION CONTENT IN REACTION TO CONTENT GENERATION

BACKGROUND

This invention relates generally to social networking systems, and in particular to presenting content in reaction to content generation in an online system, such as a social networking system.

Online systems allow users to create content that can be delivered to other users through the system. Social networking systems, for example, allow users to connect to and to communicate with other social networking system users, and so content created on the system by one user can be shared with various social networking system users. Users of a social networking system create profiles on the social networking system that are associated with their identities and include information about the users, such as interests and demographic information. The users may be individuals or entities such as corporations or charities. Users can create pages within the social networking system as another means of communicating. Pages are used to represent a subject matter, such as a business, place, company, organization, institution, brand/product, public figure, cause, community, event, group, and interest. Users can generate content to display on the page for other users to see (e.g., post on the page, sponsored content delivered to a user in the user's newsfeed) and can elect to receive content posted to the page (e.g., follow the page).

Some pages may have users who play a specific role for the page (e.g. administrator, manager, etc.). However, delivering the information or tips to these users that help guide them in creating content or improving future content for the page can be challenging. In some cases, a user may not necessarily have a page, but may be creating content separate from a page, such as an advertisement. Conventionally, online systems, such as social networking systems, incorporate the useful information in with other content being presented to the user. For example, a social networking system may incorporate the information into the user's newsfeed, on the sides of pages the user is viewing, or may provide a notification to the user. However, users may not notice information presented on different portions of the page when the information is competing with other content.

SUMMARY

An online system can provide a guide or tips to help a user create better content on the system. In some cases, the user may have a role, such as a page administrator, associated with a page (e.g., a business page for a company or brand name) provides content to an online system, such as a social networking system, to post on the page or to deliver to users outside of the page (e.g., in a user's newsfeed). In other cases, the user may be any advertiser or sponsored content generator on the system, and may not necessarily be associated with a page. The content may be or include text, photos, videos, or any other type of content that may be stored by a social networking system or other type of online system. For example, the user might provide a photo and text to include in a sponsored content item that will be presented in a newsfeed to various users. The online system generates a content item based on the provided content. In some embodiments, it associates that content with the page if the user has one, or associates it with an entity that controls the page.

After the user enters and provides the content, the online system presents reaction content items to the user. Reaction content items contain content that is useful and relevant to the user and is related to the page in the online system. For example, a reaction content item could provide a tip to the user, alert the user to new features they could use, or contain analytical information about the page. The reaction content may be displayed on a separate page of the online system from the page on which the user entered the content item, and be provided in response to the content item of the user. In addition, the reaction content items may be presented to the user instead of or prior to returning the user to the page on which the user posted.

The online system uses eligibility criteria to determine if a reaction content item is eligible to be presented to the user. For example, eligibility criteria can be based on whether the reaction content was hidden by the user, has been shown too frequently, or is not relevant to the page. The social networking system determines a measure of relevance of the eligible reaction content items. A measure of relevance measures the likelihood that a user would be interested in a reaction content item. A measure of relevance can be determined based on properties of the user, page, content item, or reaction content item.

The social networking system displays reaction content items to the user based on the eligibility criteria and/or measure of relevance for each reaction content item. The user can interact with the presented reaction content items, which may provide various actions for a user to perform in the social network, which may be related to the page on which the user has a role. In some embodiments, the user can interact with the reaction content item to view more content related to the reaction content item. A user can also interact with a reaction content item to hide the reaction content item from being presented in the future.

BRIEF DESCRIPTION OF FIGURES

Figure (FIG. 1 shows a block diagram that illustrates the high level system environment and architecture of a social networking system, according to some embodiments.

DETAILED DESCRIPTION

Figure 1:
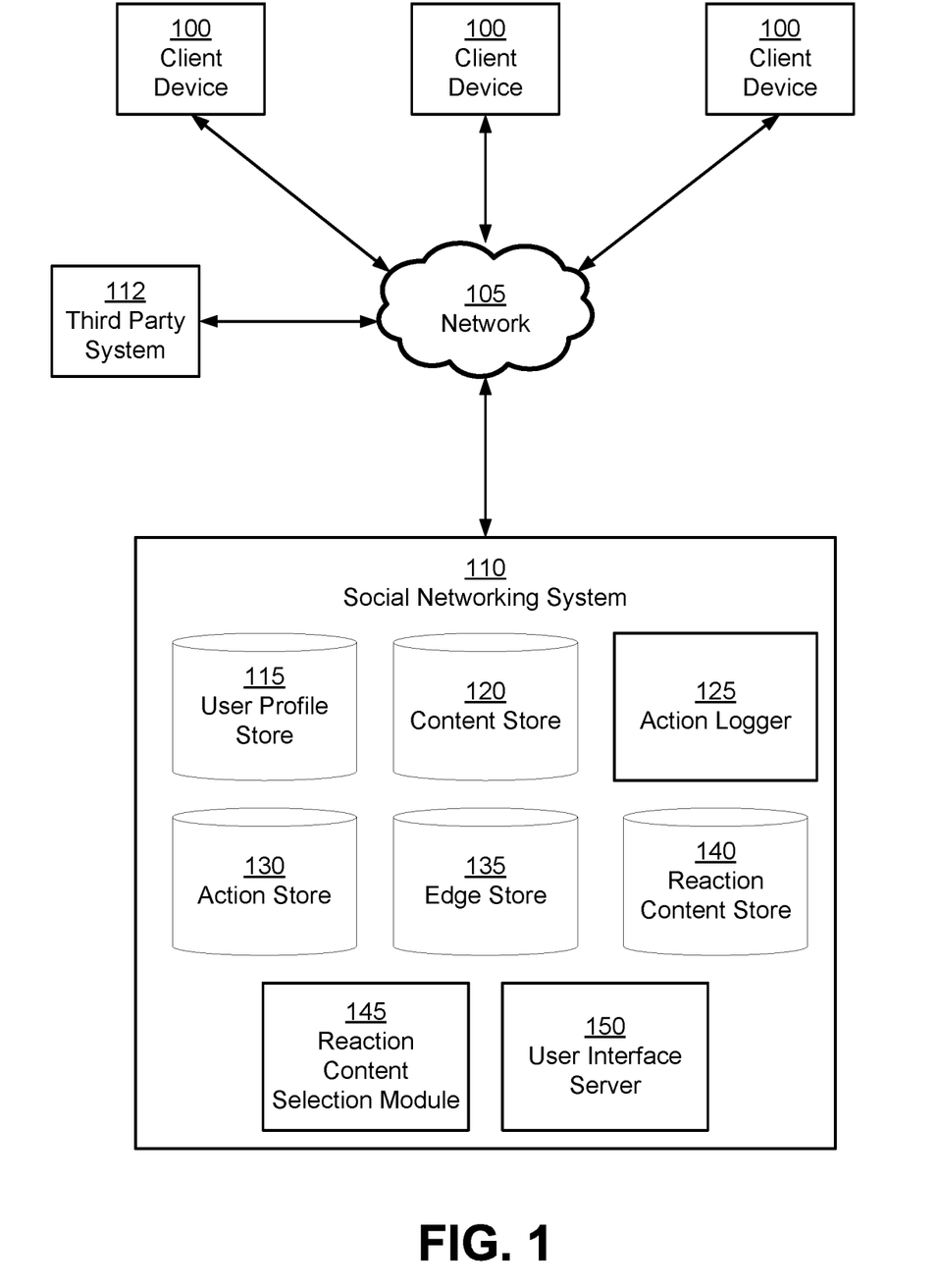

FIG. 1 is a high level block diagram of a system environment for a social networking system 110. The system environment shown by FIG. 1 includes one or more client devices 100, a network 105, one or more third-party systems 112, and the social networking system 110. In alternative configurations, different and/or additional components may be included in the system environment. The embodiments described herein can be adapted to online systems that are not social networking systems. Thus, a social networking system is used throughout as an example of such an online system, though the description is not limited to this type of online system.

The client devices 100 are one or more computing devices capable of receiving user input as well as transmitting and/or receiving data via the network 105. In one embodiment, a client device 100 is a conventional computer system, such as a desktop or laptop computer. Alternatively, a client device 100 may be a device having computer functionality, such as a personal digital assistant (PDA), a mobile telephone, a smartphone or another suitable device. A client device 100 is configured to communicate via the network 105. In one embodiment, a client device 100 executes an application allowing a user of the client device 100 to interact with the social networking system 110. For example, a client device 110 executes a browser application to enable interaction between the client device 100 and the social networking system 110 via the network 105. In another embodiment, a client device 100 interacts with the social networking system 110 through an application programming interface (API) running on a native operating system of the client device 100, such as IOS® or ANDROID™.

The client devices 100 are configured to communicate via the network 105, which may include any combination of local area and wide area networks, using wired or wireless communication systems. In one embodiment, the network 105 uses standard communications technologies and/or protocols. For example, the network 105 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 105 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 105 may be represented using any suitable format, such as hypertext markup language (HTML) or extensible markup language (XML). In some embodiments, all or some of the communication links of the network 105 may be encrypted using any suitable technique or techniques.

One or more third party systems 112 may be coupled to the network 105 for communicating with the social networking system 110, which is further described below in conjunction with FIG. 1. In one embodiment, a third party system 112 is an application provider communicating information describing applications for execution by a client device 100 or communicating data to client devices 100 for use by an application executing on the client device. In other embodiments, a third party system 112 provides content or other information for presentation via a client device 100. A third party system 112 may also communicate information to the social networking system 110, such as advertisements, content, or information about an application provided by the third party system 112.

The social networking system 110 shown in FIG. 1 includes a user profile store 115, a content store 120, an action logger 125, an action store 130, an edge store 135, a reaction content store 140, a reaction content selection module 145, and a user interface server 150. In other embodiments, the social networking system 110 may include additional, fewer, or different components for various applications. Conventional components such as network interfaces, security functions, load balancers, failover servers, management and network operations consoles, and the like are not shown so as to not obscure the details of the system architecture.

Each user of the social networking system 110 is associated with a user profile, which is stored in the user profile store 205. A user profile includes declarative information about the user that was explicitly shared by the user and may also include profile information inferred by the social networking system 110. In one embodiment, a user profile includes multiple data fields, each describing one or more attributes of the corresponding user of the social networking system 110. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with identification information of users of the social networking system 110 displayed in an image. A user profile in the user profile store 115 may also maintain references to actions by the corresponding user performed on content items in the content store 120 and stored in the action store 130.

The content store 120 stores objects that each represent various types of content. Examples of content represented by an object include a page post, a status update, a photograph, a video, a link, a shared content item, a gaming application achievement, a check-in event at a local business, a brand page, or any other type of content. Social networking system users may create objects stored by the content store 120, such as status updates, photos tagged by users to be associated with other objects in the social networking system, events, groups or applications. In some embodiments, objects are received from third-party applications or third-party applications separate from the social networking system 110. In one embodiment, objects in the content store 120 represent single pieces of content, or content "items." Hence, users of the social networking system 110 are encouraged to communicate with each other by posting text and content items of various types of media through various communication channels. This increases the amount of interaction of users with each other and increases the frequency with which users interact within the social networking system 110.

The content store 120 organizes content items into pages, to which users may post the content items for the page. Pages are used to represent a specific subject matter, such as a business, place, company, organization, institution, brand/product, public figure, cause, community, event, group, and interest. A page stored by the content store 120 may have references to other content items that were posted on the page by users. Pages are associated with page profiles, which are stored in the content store 120. Page profiles are used to post content items on a page on behalf of the page itself. In some embodiments, users who perform roles for a page use page profiles to post content items to the page on behalf of the page itself. Pages may be controlled by one or more users that have various roles with respect to the page, such as an administrator or manager, which provide various permissions for interacting with the page. An administrator, for example, may designate roles, assign a new administrator and managers, and perform other administrative capacities, while a manager may post and modify content items to the page. In some embodiments, pages are associated with a single role, while in other embodiments pages may be associated with a variety of different roles assigned to different users.

The action logger 125 receives communications about user actions internal to and/or external to the social networking system 110, populating the action store 130 with information about user actions. Examples of actions include adding a connection to another user, sending a message to another user, uploading an image, reading a message from another user, viewing content associated with another user, attending an event posted by another user, among others. In addition, a number of actions may involve an object and one or more particular users, so these actions are associated with those users as well and stored in the action store 130.

The action store 130 may be used by the social networking system 110 to track user actions on the social networking system 110, as well as actions on third party systems 112 that communicate information to the social networking system 110. Users may interact with various objects on the social networking system 110, and information describing these interactions are stored in the action log 120. Examples of interactions with objects include: commenting on posts, sharing links, and checking-in to physical locations via a mobile device, accessing content items, and any other interactions. Additional examples of interactions with objects on the social networking system 110 that are included in the action store 130 include: commenting on a photo album, communicating with a user, establishing a connection with an object, joining an event to a calendar, joining a group, creating an event, authorizing an application, using an application, expressing a preference for an object ("liking" the object) and engaging in a transaction. Additionally, the action store 130 may record a user's interactions with advertisements on the social networking system 110 as well as with other applications operating on the social networking system 110. In some embodiments, data from the action store 130 is used to infer interests or preferences of a user, augmenting the interests included in the user's user profile and allowing a more complete understanding of user preferences.

The action store 130 may also store user actions taken on a third party system 112, such as an external website, and communicated to the social networking system 110. For example, an e-commerce website that primarily sells sporting equipment at bargain prices may recognize a user of a social networking system 110 through a social plug-in enabling the e-commerce website to identify the user of the social networking system 110. Because users of the social networking system 110 are uniquely identifiable, e-commerce websites, such as this sporting equipment retailer, may communicate information about a user's actions outside of the social networking system 110 to the social networking system 110 for association with the user. Hence, the action store 130 may record information about actions users perform on a third party system 112, including webpage viewing histories, advertisements that were engaged, purchases made, and other patterns from shopping and buying.

In one embodiment, an edge store 135 stores information describing connections between users and other objects on the social networking system 110 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 110, such as expressing interest in a page on the social networking system, sharing a link with other users of the social networking system, and commenting on posts made by other users of the social networking system.

In one embodiment, an edge may include various features each representing characteristics of interactions between users, interactions between users and object, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the social networking system 110, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

In some embodiments, a page has references to edges between the page and users of the social networking system 110. In some embodiments, an edge between a page and a user can be used to represent a user who has chosen to receive content associated with the page. In some embodiments, an edge between a page and a user can be used to represent the user performing a particular role for the page. For example, a user might be an administrator of a page and be responsible for managing the page, including posting content to the page, editing details and properties associated with the page, viewing analytical insights associated with the page, assigning page roles to others, generating advertisements for the page, etc.

The edge store 135 also stores information about edges, such as affinity scores for objects, interests, and other users. Affinity scores, or "affinities," may be computed by the social networking system 110 over time to approximate a user's affinity for an object, interest, and other users in the social networking system 110 based on the actions performed by the user. A user's affinity may be computed by the social networking system 110 over time to approximate a user's affinity for an object, interest, and other users in the social networking system 110 based on the actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 135, in one embodiment. Alternatively, each interaction between a user and a specific object is stored as a separate edge. In some embodiments, connections between users may be stored in the user profile store 115, or the user profile store 115 may access the edge store 135 to determine connections between users.

Reaction content items are stored in the reaction content store 140. Reaction content items store content for display to a user who recently posted content to a page. The reaction content items may describe further actions that the user may take with respect to the page to encourage the user to further interact with and promote the page and its content items. For example, a reaction content item may store content about how the user can promote a content item posted to the page. In some embodiments, each reaction content item has a type dependent on the content in the reaction content item. Some examples of the type of content that could be stored in a reaction content item include: information about how to promote the content item or the page; congratulatory information; tips for improving the post or the page; new features of the social networking system 110 the user may want to use; analytical information about the page; and an advertisement for content on the social networking system 110 or on a third party system 112. In some embodiments, a reaction content item is generated or modified to personalize the reaction content item to a posted content item, the page, or the user. For example, the reaction content store 140 may generate a reaction content item with analytical information about the page to present to the user. In some embodiments, reaction content items are pre-generated and stored in the reaction store 140. In some embodiments, the reaction content store 140 is a part of the content store 120.

Reaction content items can have references to other content on the social networking system 110, allowing the social networking system to associate the other content with the reaction content item. In some embodiments, a reaction content item stores a reference to a content item to be displayed in the reaction content item. Photos, videos, applications, advertisements, events, groups, and other pages are all examples of content items that could be associated with a reaction content item. In some embodiments, a referenced content item affects the display of the reaction content item. For example, the reaction content item may display a statistic computed for one or more referenced content items. In some embodiments, reaction content items contain links to internet locations with content related to the reaction content item. For example, if a reaction content item contains information about a new feature for a page, it may contain a link to a page within the social networking system 110 with more information about the feature. As another example, if a reaction content item contains information advertising a business, it may also contain a link to the page for the business in the social networking system 110 or to the business's website.

A reaction content item also may have a reference to an action stored on the social networking system. An action associated with a reaction content item can include interactions with the content referenced by the item performed by a user, the user accessing a page linked by the reaction content item, and the user hiding the reaction content item. If a user hides a reaction content item, the social networking system will not subsequently present the reaction content item to the user. An action referenced by a reaction content item could also describe a user interacting with a content item stored by the reaction content item.

The reaction content selection module 145 determines reaction content items to present to a user. Reaction content items are presented to a user in response to the user posting a content item on a page. The reaction content selection module 145 determines if a reaction content item is eligible for presentation to a user based on eligibility criteria describing characteristics of users, pages and advertisements that make a reaction content item eligible to be shown. Each reaction content item may have its own eligibility criteria. Eligibility criteria can be based on the content item, the page, and the user. In some embodiments, the eligibility criteria require the reaction content item to be relevant to the content item, page, and user. For example, the eligibility criteria may prevent a reaction content item with tips on how to improve posts with photos to be presented to the user after the user posts a video or a link to the page. In some embodiments, the eligibility criteria are based on the type of the reaction content item. For example, the reaction content selection module 145 may not present a reaction content item with new content relating to features if the reaction content selection module 145 had recently shown a similar reaction content item relating to another new feature. In some embodiments, the eligibility criteria require an event to occur for the reaction content item to be shown. For example, a reaction content selection module 145 will not show a reaction content item with congratulatory content on the 100th content item posted to the page until the 100th content item has been posted. In some embodiments, the eligibility criteria are based on whether the reaction content item has been hidden by the user. In some embodiments, the eligibility criteria specify a particular role of the viewing user for a page. For example, a reaction content item with analytical information for a page may only be presented to a user who is an administrator for a page.

The reaction content selection module 145 determines a measure of relevance of eligible reaction content items to the user to determine which reaction content items to present to the user. The measure of relevance is the likelihood that the reaction content item would be of interests to the user. In some embodiments, a measure of relevance is determined based on characteristics of the user, the page, the posted content item, and the reaction content item. Each reaction content item or type of reaction content item may have a different method for determining the relevance of that reaction content item. For example, a reaction content item that promotes page posting may be highly relevant for low-frequency posters, but have a low relevance for high-frequency posters. Characteristics used to measure relevance may describe types and frequency of user interactions with the page, interactions of other users with the page, user characteristics of the posting user, and other information related to information of the reaction content item. In one example, the measure of relevance may also identify social networking objects associated with the page or posted content item and determine an affinity between the user and an object associated with the reaction content item. Example characteristics relating to the user include: how often the user generates content items; how often other users interact with content items generated by the user; the user's role associated with the page; and characteristics of the user profile associated with the user. Example characteristics relating to the page include: the type of the page; details associated with the page; the number of users who have chosen to receive content items associated with the page; and the length of time the page has been active. Example characteristics relating to the content item include the content associated with the content item and the type of the content item. Example characteristics relating to the reaction content item include: if or when the reaction content item was presented previously; if or when the user has previously interacted with the reaction content item or similar reaction content items; the type of the reaction content item; and the types of reaction content items shown to the user previously. Other characteristics may also to be used depending on the desired information provided by a reaction content item. In some embodiments, the reaction content selection module 145 assigns weightings to the characteristics based on the likelihood that the characteristic represents relevance of the reaction content item to the user.

The reaction content selection module 145 determines which reaction content items to present to the user based on the measures of relevance of the eligible reaction content items. In some embodiments, the reaction content selection module 145 ranks eligible reaction content items based on the measures of relevance of each reaction content item. In some embodiments, the reaction content selection module 145 uses a threshold for the measures of relevance to determine which reaction content items to show (e.g. the measure of relevance for a reaction content item must exceed some threshold to be shown). In some embodiments, the reaction content selection module 145 will designate a reaction content item as a priority, and will select the reaction content item regardless of its measure of relevance. For example, to spread knowledge of a new feature, the reaction content selection module 145 will present reaction content items related to the new feature. In some embodiments, the reaction content selection module 145 will designate a reaction content item as a priority if it relates to an event and the event occurs. For example, if the user posts on a page for the first time and a reaction content item contains content relating to the first post on a page, the reaction content selection module 145 may designate that reaction content item as a priority.

The reaction content items may also be selected without reference to a measure of relevance. In this example, the set of selected content items is chosen from the eligible reaction content items and may be by another selection criteria. For example the reaction content items may be selected according to which content items were least-recently viewed by the user or at random.

The eligible reaction content items may also be selected using the type of the reaction content items. In this example, each reaction content item is associated with a type, and the types of reaction content items are grouped according to the types. From each type of content item, a maximum number of reaction content items may be selected, for example, to select one reaction content item from each type (e.g. the reaction content selection module 145 may select no more than one reaction content item of each type). In this example, rather than determining a measure of relevance or eligibility for a set of reaction content items, the eligibility or measure of relevance may be measured for a type of reaction content items, and a specific reaction content item may be chosen from that type after the type is selected for presentation.

The user interface server 150 provides a frontend interface for the social networking system 110 to communicate via the network 105 with the one or more client devices 100, as well as to the one or more third party systems 112. The user interface server 150 serves web pages, as well as other web-related content, such as JAVA®, FLASH®, XML and so forth. The user interface server 150 may receive and route messages between the social networking system 110 and the client device 100, for example, instant messages, queued messages (e.g., email), text messages, short message service (SMS) messages, or messages sent using any other suitable messaging technique. A user may send a request to the user interface server 150 to upload information (e.g., images or videos) that is stored in the content store 120. Additionally, the user interface server 150 may provide application programming interface (API) functionality to send data directly to native client device operating systems, such as IOS®, ANDROID™, WEBOS® or RIM®.

The user interface server 150 generates user interfaces, such as web pages, with content from the social networking system 110. The user interfaces are displayed to the user through a client device 100 and network 105. The user interfaces provided by the user interface server 150 allows a user to generate content items and interact with content items stored by the content store 120. For example, a user interface may provide a method for a user to provide text, pictures, videos, links, and advertisements to be used to generate content items. The user interface server 150 configures a user interface based on the client device 100 accessing the social networking system 110. For example, a user interface for a smartphone with a touchscreen may be configured differently from a user interface for a web browser on a computer.

The user interface server 150 can include reaction content items in a user interface in response to the user posting a content item on a page. The user interface server 150 can receive an alert from the action logger 125 that the user generated the content item and receive the reaction content items to present to the user from the reaction content selection module 145. In some embodiments, the user interface server 150 presents reaction content items to the user on a reaction interface consecutive to a posting interface for posting content items. In some embodiments, the user interface includes an interaction interface for each reaction content item, allowing the user to interact with the reaction content item. In some embodiments, the interaction interface allows the user to view content related to the reaction content item. For example, if a reaction content item is associated with a photo or a video, the interaction interface may allow the user to view the photo or video. In some embodiments, a user interface allows a user to hide a reaction content item. If a reaction content item is hidden by a user, the social networking system will not present the reaction content item to the user.

In some embodiments, the user interface server 150 presents a reaction interface with reaction content items in response to certain events. For example, the user interface server 150 may present a reaction interface to a user with a role associated with a page if the user has not posted to the page recently or if the user is viewing a content item that would be relevant to the page. In some embodiments, the user interface server 150 will present the reaction interface to a user if a special event occurs, such as the page reaching a certain number of followers, a content item receiving a certain number of interactions, and the page having been active for a certain period of time.

Presenting Reaction Content in Response to Generating Content

Figure 2:
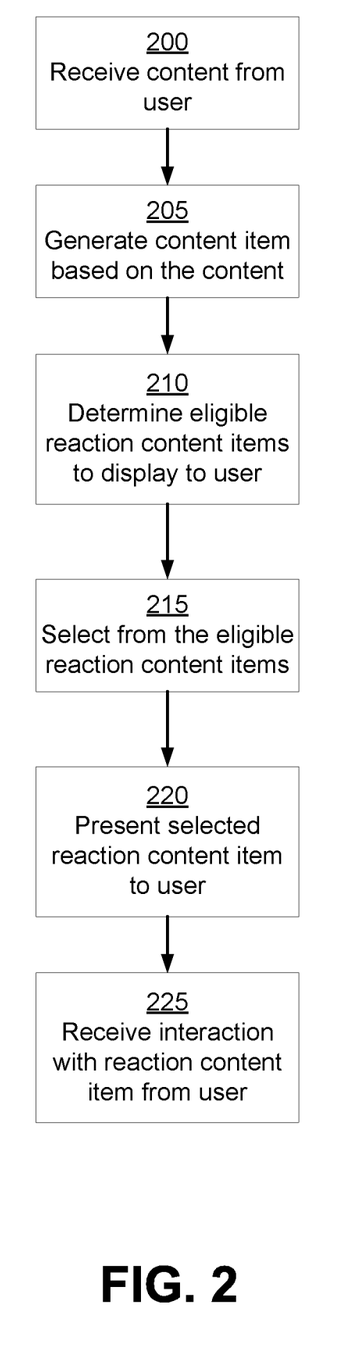
FIG. 2 shows a flowchart that illustrates a method for selecting reaction content items, according to some embodiments.

FIG. 2 shows a flowchart that illustrates a method for selecting reaction content items, according to some embodiments. In other embodiments, the method may include different and/or additional steps than those shown in FIG. 2. Additionally, steps of the method may be performed in different orders than the order described in conjunction with FIG. 2 in various embodiments.

A social networking system 110 receives 200 content from a user of the social networking system 110. The content can include text, photos, video, links, advertisements, applications, or any other content that is stored by the social networking system. The content item is received by the user posting the content either to a page or outside of the page (e.g., in a newsfeed or on another page) in the social networking system 110. In some embodiments, the content is received from the user through a posting interface provided by the social networking system 110. The social networking system 110 generates 205 a content item based on the content provided and the content item is associated with a page to which the content was posted. In some embodiments, the generation is simply providing the text that the was provided by the user The social networking system 110 determines 210 eligible reaction content items to display to the user. The social networking system 110 uses eligibility criteria to determine whether a reaction content item is eligible. Eligibility criteria can be based on the content item, the page, the user or the reaction content item. In some embodiments, eligibility criteria are based on whether the user performs a role for the page.

The social networking system 110 selects 215 reaction content items from the eligible reaction content items based on a measure of relevance determined for each eligible reaction content item. In some embodiments, the measure of relevance is based on characteristics related to the user, the page, the content item, or the reaction content item. In some embodiments, the characteristics are weighted based on the likelihood that the characteristic represents relevance of the reaction content item to the user.

The social networking system 110 presents 220 the selected reaction content items to the user through a user interface generated by the social networking system 110. In some embodiments, the reaction content items are presented to the user through a reaction interface consecutive to a posting interface. In some embodiments, the reaction content items are displayed with an interface that the user can use to hide the reaction content item. In some embodiments, the reaction content items are presented with an interaction interface. The interaction interface allows the user to interact 225 with the reaction content item. For example, if a reaction content item is related to a content item stored by the social networking system 110, the interaction interface may allow the user to interact with the related content item. In some embodiments, the interaction interface includes an interface that allows the user hide the reaction content item.

Presenting Reaction Content Items

Figure 3:
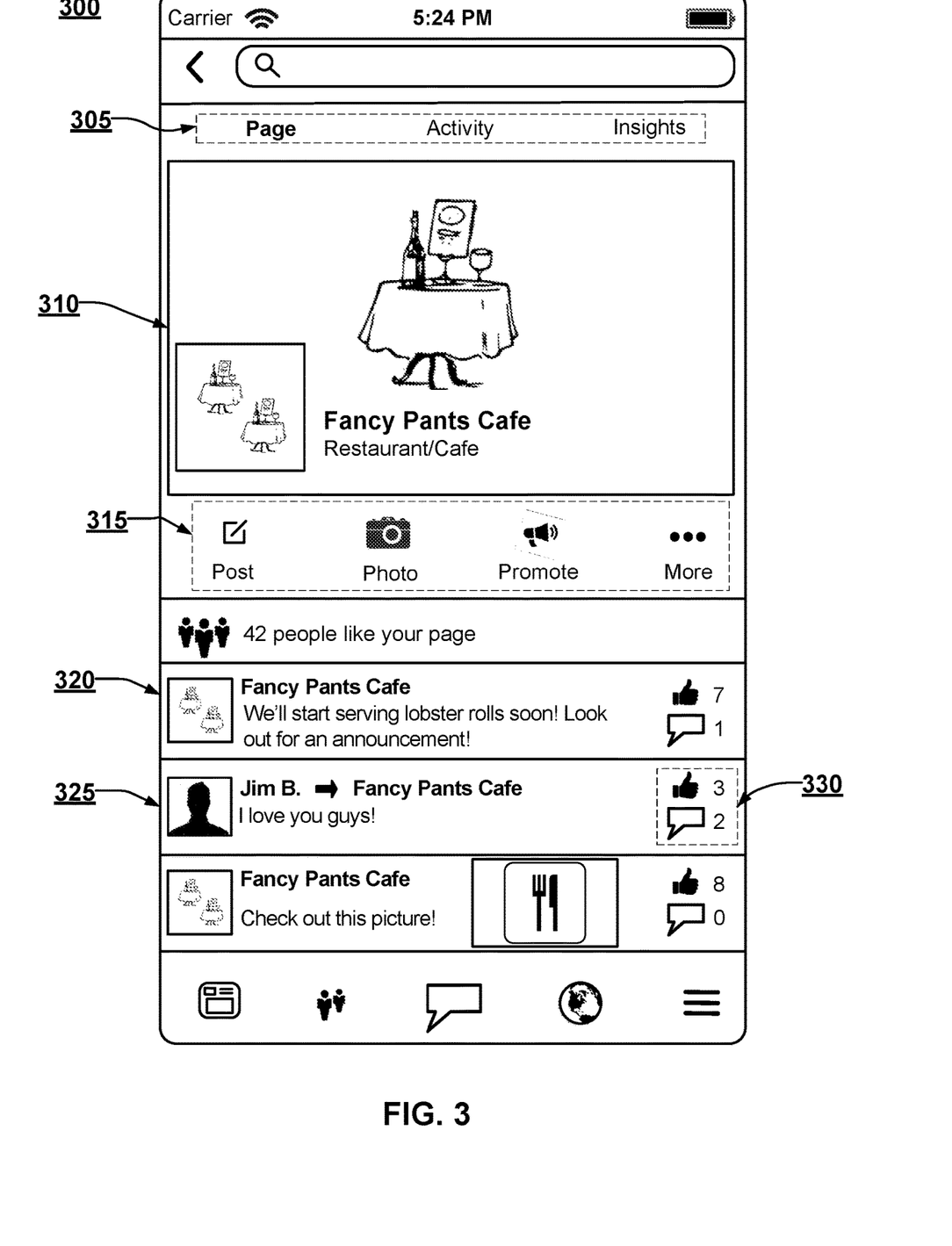
FIG. 3 shows an example interface of a page in a social networking system, according to some embodiments.

FIG. 3 shows an example interface of a page 300 in a social networking system, according to some embodiments. The page 300 is displayed to a user through a user interface and is shown as displayed to a user having a role with respect to the page, such as a page administrator. In the embodiment presented, the page 300 is for a restaurant called "Fancy Pants Cafe." The page has tabs 305 that show different content or information associated with the page. A banner 310 is displayed at the top of the page with the name of the business, the type of the page, and a pictures that are used to represent the page. A content posting interface 315 allows the user post content to the page, such as text, a photograph, and an advertisement.

The page 300 displays content items that have been posted to the page. For example, a status 320 has been posted to the page using a profile representing the page. In some embodiments, a user who performs a role for the page is capable of posting on a page using a profile representing the page. The content items posted on the page can include a photo, a video, a link, or an advertisement. Other users can post content 325 to the page as well using their corresponding user profile, and can interact with content items posted on the page. Interactions with a content item are displayed along with the posted content item 330.

Figure 4:
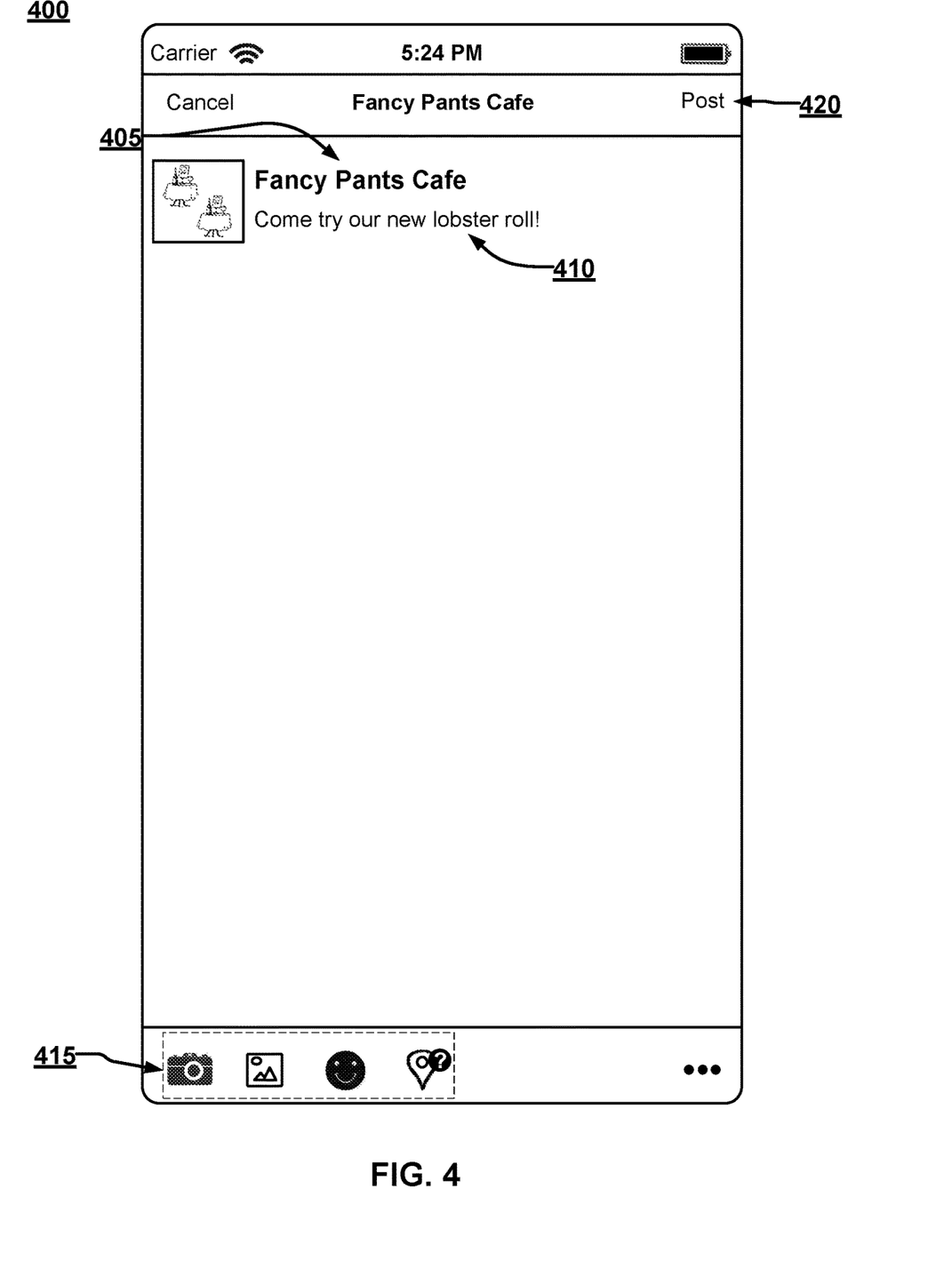
FIG. 4 shows an example interface presented to a user to post a status to a page, according to some embodiments.

FIG. 4 shows an example interface 400 presented to a user to post a status to a page, according to some embodiments. In the embodiment presented, the user performs a role for the page (e.g. administrator) and is posting a status using a profile associated with the page. The name 405 of the page is presented to designate that the user is posting a content item through the profile associated with the page, as well as a text interface 410 in which the user can type text to include with the post. Buttons 415 are presented which the user can use to include other content in the post, such as a photograph, a location, or a link. The user can generate a content item based on the content provided and post the content item to the page by pressing the "Post" button 420.

Figure 5A:
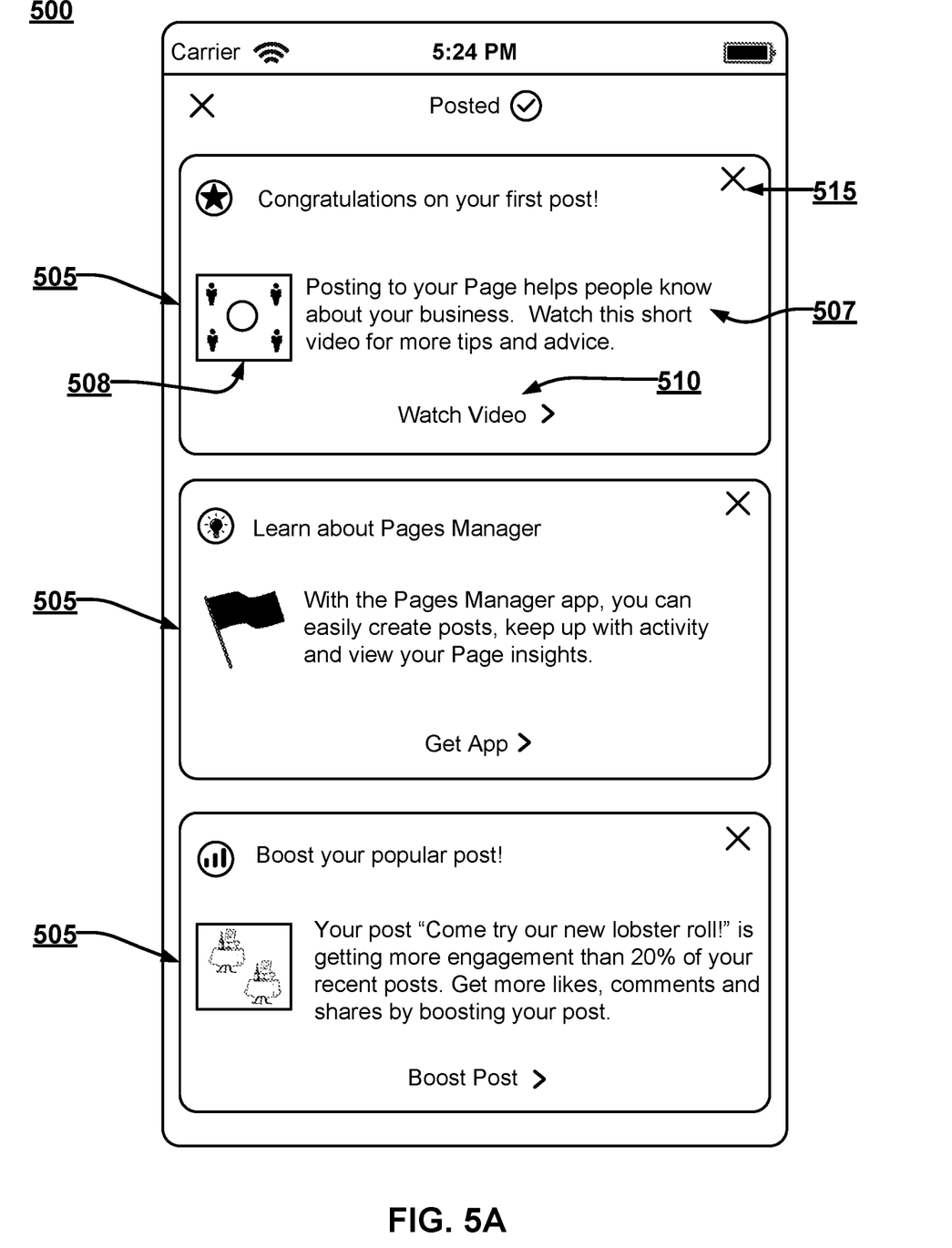
FIG. 5A shows an example interface with reaction content items presented to a user in response to a post on a page, according to some embodiments.

FIG. 5A shows an example interface with reaction content items 505 presented to a user in response to a post on a page, according to some embodiments. The reaction content items 505 are presented in a display interface 500. In the embodiment presented in FIG. 5A, the reaction content items 505 are presented with the content 507 associated with the reaction content item and an icon 508 used to represent the content or type of the reaction content item. An interaction interface 510 is presented with each reaction content item. A user can perform an action related to the reaction content item through the interaction interface 510.

Figure 5B:
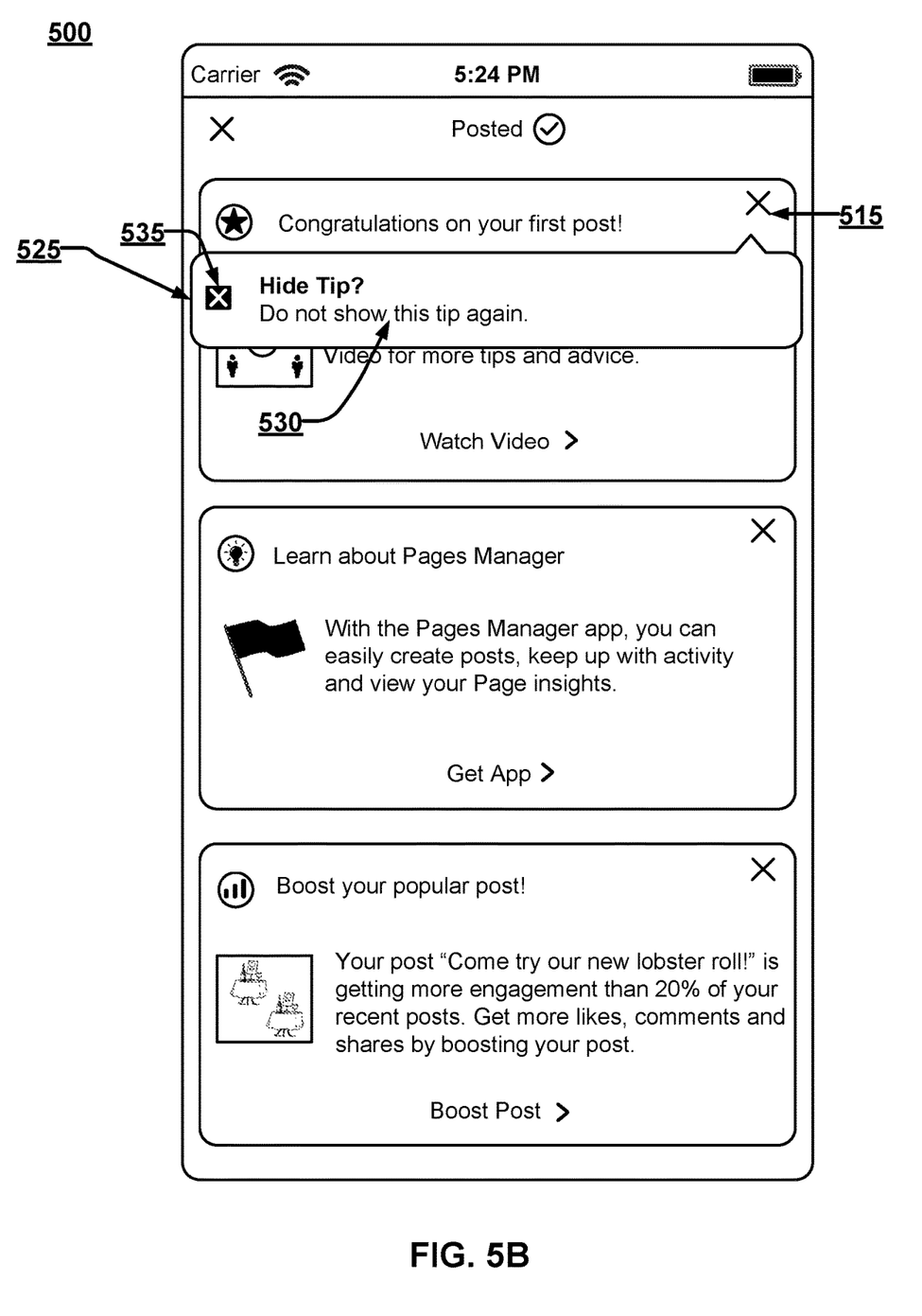
FIG. 5B shows an example interface with an option being presented to a user to hide a reaction content item, according to some embodiments.

The user can choose to hide a reaction content item by selecting the hide button 515 associated with a reaction content item. After hiding the reaction content item, the social networking system will not present the reaction content item to the user. FIG. 5B shows an example interface with an option 525 being presented to a user to hide a reaction content item, according to some embodiments. The user can choose to hide the reaction content item by selecting the option at 530. In some embodiments, the option 525 allows the user to designate either an amount of time to hide the reaction content item, or to hide the reaction content item permanently. The option is presented with a button 535 that allows the user to decline to hide the reaction content item if, for example, the user accidentally selected button 515.

Alternate Configurations

In alternate embodiments, reaction content items can be presented to a user in response to the user generating advertisements for a page instead of or in addition to when the user posts a content item to a page. A user may have a role associated with a page that allows the user to generate advertisements to other users of the social network promoting the page. In some embodiments, the advertisements appear in a newsfeed of content items for the user. Reaction content items can contain information relating to the generated advertisements that is relevant to the user. For example, reaction content items could have statistical information about previous advertisements, or tips on how to improve the advertisements. In some embodiments, the reaction content items are selected using a measure of relevance that is determined based on characteristics of the user, page, advertisement, or reaction content item. In some embodiments, the reaction content items are selected based on eligibility criteria that describe characteristics of users, pages and advertisements make a reaction content item eligible to be shown. Reaction content items may be presented on a reaction interface consecutive to an advertisement generation interface. In some embodiments, a reaction interface with reaction content items are presented when certain events occur, such as an advertisement campaign expiring, an advertising budget being depleted, or other events relating to the management of an advertisement campaign.

SUMMARY

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may include a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may include information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

The invention claimed is:

1. A method comprising:
    storing, in a social networking system, a plurality of reaction content items associated with management of pages in the social networking system;
    receiving, through a content generation interface for a page in the social networking system, content generated by a posting user of the social networking system;
    generating a user content item based on the received content, the user content item being associated with the page;
    determining that the posting user of the social networking system is assigned a role to manage, interactions with, the page;
    when the posting user is associated with the role to manage the page,
        automatically selecting, by the social networking system, a set of eligible reaction content items from the plurality of reaction content items based on characteristics of the posting user satisfying a plurality of predetermined eligibility criteria to determine eligibility of each reaction content item, of the selected set of eligible reaction content items, to be presented for display to the posting user, wherein each reaction content item from the plurality of reaction content items provides information relating to management of the page by the posting user;
        ranking the selected set of eligible reaction content items based on a measure of relevance of each selected reaction content item to the posting user;
        automatically selecting, by the social networking system, a reaction content item from the set of eligible reaction content items based on the ranked set of eligible reaction content items;
    responsive to the posting user providing the generated user content item, presenting, by the social networking system, the selected reaction content item to the posting user, the selected reaction content item being displayed with an interaction interface, wherein the selected reaction content item is presented to the posting user on a reaction interface immediately consecutive to the content generation interface; and
    receiving, from the posting user, an interaction with the selected reaction content item through the interaction interface presented with the selected reaction content item.

2. The method of claim 1, further comprising:
    responsive to receiving the interaction with the selected reaction content item, presenting to the user content related to the selected reaction content item.

3. The method of claim 1, wherein the measure of relevance describes the likelihood that the posting user would be interested viewing the content, and is determined based on one or more characteristics associated with the posting user, the page, and the user content.

4. The method of claim 1, wherein eligibility criteria describe characteristics of the posting user, pages and advertisements make a reaction content item eligible to be shown, and are based on at least one of the posting user, the page, and the user content.

5. The method of claim 1, wherein the selected reaction content item is pre-generated by the social networking system.

6. The method of claim 1, wherein the selected reaction content item is modified to include personalized information relating to the page, user content, or posting user.

7. The method of claim 1, wherein the measure of relevance of the selected reaction content item must exceed a threshold to be selected.

8. The method of claim 1, wherein the selected reaction content item comprises information about a new feature of the social networking system, analytical information about the page, or advice about how to improve the page.

9. The method of claim 1, wherein each reaction content item is associated with a type, and no more than one reaction content item for each type is selected from the set of eligible reaction content items.

10. The method of claim 1, wherein the eligibility criteria include whether the posting user has hidden a reaction content item in the past.

11. The method of claim 1, wherein the received interaction comprises a posting user selection to hide the selected reaction content item.

12. The method of claim 1, wherein the characteristics further comprise characteristics of the generated user content item and the page.

13. A computer program product comprising a non-transitory computer-readable storage medium having instructions encoded thereon that, when executed by a processor, cause the processor to:
- store, in a social networking system, a plurality of reaction content items associated with management of pages in the social networking system;
- receive, through a content generation interface for a page in the social networking system, content generated by a posting user of the social networking system;
- generate a user content item based on the received content being associated with the page;
- determine that the posting user of the social networking system is assigned a role to manage, interactions with, the page;
- when the posting user is associated with the role to manage the page,
  - automatically select, by the social networking system, a set of eligible reaction content items from the plurality of reaction content items based on characteristics of the posting user satisfying a plurality of predetermined eligibility criteria to determine eligibility of each reaction content item, of the selected set of eligible reaction content items, to be presented for display to the posting user, wherein each reaction content item from the plurality of reaction content items provides information relating to management of the page by the posting user;
  - rank, by the social networking system, the selected set of eligible reaction content items based on a measure of relevance of each selected reaction content item to the posting user;
  - automatically select, by the social networking system, a reaction content item from the set of eligible reaction content items based on the ranked set of eligible reaction content items;
- responsive to the posting user providing the generated user content item, present, by the social networking system, the selected reaction content item to the posting user, the selected reaction content item being displayed with an interaction interface, wherein the selected reaction content item is presented to the posting user on a reaction interface immediately consecutive to the content generation interface; and
- receive, from the posting user, an interaction with the selected reaction content item through the interaction interface presented with the selected reaction content item.

14. The computer program product of claim 13, wherein the measure of relevance is determined based on one or more characteristics associated with the posting user, the page, and the user content.

15. The computer program product of claim 13, wherein the selected reaction content item is pre-generated by the social networking system.

16. The computer program product of claim 13, wherein the selected reaction content item is modified to include information relating to the page.

17. The computer program product of claim 13, wherein the selected reaction content item comprises information about a new feature of the social networking system, analytical information about the page, or advice about how to improve the page.

18. The computer program product of claim 13, wherein the eligibility criteria include whether the posting user has hidden a reaction content item in the past.

19. The computer program product of claim 13, wherein each reaction content item is associated with a type, and no more than one reaction content item for each type is selected from the set of eligible reaction content items.

20. The computer program product of claim 13, wherein the received interaction comprises a posting user selection to hide the selected reaction content item.

* * * * *